(12) United States Patent
Nyström

(10) Patent No.: US 6,398,293 B1
(45) Date of Patent: Jun. 4, 2002

(54) CABIN WITH SUSPENSION SYSTEM, ESPECIALLY FOR CROSS-COUNTRY VEHICLES

(75) Inventor: Sten Nyström, Malá (SE)

(73) Assignee: Tigercat Industries Inc., Paris (CA)

( * ) Notice: Subject to any disclaimer, the term of this patent is extended or adjusted under 35 U.S.C. 154(b) by 0 days.

(21) Appl. No.: 09/509,656

(22) PCT Filed: Jul. 31, 1998

(86) PCT No.: PCT/SE98/01428

§ 371 (c)(1),
(2), (4) Date: Jun. 8, 2000

(87) PCT Pub. No.: WO99/16661

PCT Pub. Date: Apr. 8, 1999

(30) Foreign Application Priority Data

Sep. 30, 1997 (SE) ............................................. 9703537

(51) Int. Cl.⁷ ........................ B62D 33/06; B62D 33/063
(52) U.S. Cl. .......................... 296/190.04; 296/190.05; 180/89.14
(58) Field of Search ....................... 296/190.04, 190.05, 296/190.07; 180/89.13, 89.14

(56) References Cited

U.S. PATENT DOCUMENTS

| | | | | |
|---|---|---|---|---|
| 3,315,758 A | * | 4/1967 | Allen | 180/89.13 |
| 3,398,967 A | * | 8/1968 | Brocklebank et al. | 280/6 |
| 4,235,470 A | * | 11/1980 | Kauss et al. | 296/190.07 |
| 4,265,328 A | * | 5/1981 | Rowa et al. | 180/89.13 |
| 4,330,149 A | * | 5/1982 | Salmon | 296/190.05 |
| 4,365,682 A | * | 12/1982 | Frey et al. | 296/190.04 |
| 4,488,613 A | * | 12/1984 | Marjoram | 296/190.05 |
| 4,506,792 A | * | 3/1985 | Hedlund et al. | 180/89.13 |
| 4,580,797 A | * | 4/1986 | Ericsson | 280/6 H |
| 4,650,017 A | * | 3/1987 | Pelletier et al. | 180/9.1 |
| 4,991,673 A | * | 2/1991 | Ericsson | 180/41 |
| 5,337,847 A | * | 8/1994 | Woods et al. | 180/9.52 |
| 5,368,119 A | * | 11/1994 | Nystrom | 180/89.14 |
| 5,368,271 A | * | 11/1994 | Kiunke et al. | 248/638 |
| 5,822,813 A | * | 10/1998 | Powell | 5/118 |
| 5,950,489 A | * | 9/1999 | McKenzie | 180/89.15 |
| 5,984,036 A | * | 11/1999 | Higuchi et al. | 296/190.07 |
| 6,105,699 A | * | 8/2000 | Hinds | 180/89.13 |

FOREIGN PATENT DOCUMENTS

| | | | |
|---|---|---|---|
| CH | 563 274 | | 6/1975 |
| DE | 3000606 | * | 7/1981 |
| DE | 3405921 | | 9/1985 |

* cited by examiner

Primary Examiner—D. Glenn Dayoan
Assistant Examiner—Hilary Gutman
(74) Attorney, Agent, or Firm—Renner, Otto, Boisselle & Sklar LLP

(57) ABSTRACT

A cabin primarily intended for cross-country vehicles where the cabin is held up by a supporting device which includes a partially circular-shaped first bearing device lying in a vertical plane with the convex side facing downwards when the vehicle is standing horizontally. A base mounting plate attached to the vehicle's chassis is provided with a partially circular-shaped second bearing device that is equivalent to and interacting with this supporting device's bearing device, whereby the bearing device's common center forms a first axis of oscillation for the cabin in a first plane, and wherein the cabin is able to pivot about a second axis of oscillation that is perpendicular to the first axis of oscillation.

9 Claims, 4 Drawing Sheets

CABIN WITH SUSPENSION SYSTEM, ESPECIALLY FOR CROSS-COUNTRY VEHICLES

The present invention concerns a cabin primarily intended for cross-country vehicles.

BACKGROUND OF THE INVENTION

Normally, the control cabin of cross-country vehicles such as forestry tractors and tree-cutting vehicles is rigidly attached to the vehicle's chassis and therefore follows all the movements of the vehicle in the terrain. These movements can have large amplitudes and powerful acceleration as well as retardation in sideways directions as well as forwards and backwards. This often makes it difficult and strenuous for the driver who, in addition to controlling the vehicle, must also remain in the driver's seat.

To solve this problem and thereby offer better working conditions for the driver, experiments have been made with gyroscopically suspended driver seats, cabins that are hydraulically maneuvered from below, as well as different types of hydraulically maneuverable axle pivoting systems for adjusting the vehicle's wheels in relation to the chassis. Pivoting cabins suspended from above have even been noted. These known systems are complicated and costly and, to the extent in which they have been manufactured, have still not been completely accepted in the marketplace.

SUMMARY OF THE INVENTION

Through the present invention, a pivoting cabin whose system of suspension is cheap and robust and requires little space outside the cabin is achieved. Due to the simplicity of the suspension system, the cabin is comparatively cheap to manufacture.

BRIEF DESCRIPTION OF THE DRAWINGS

The invention will be described in greater detail in the form of examples with reference to the drawings in which.

DETAILED DESCRIPTION

Figure 1:
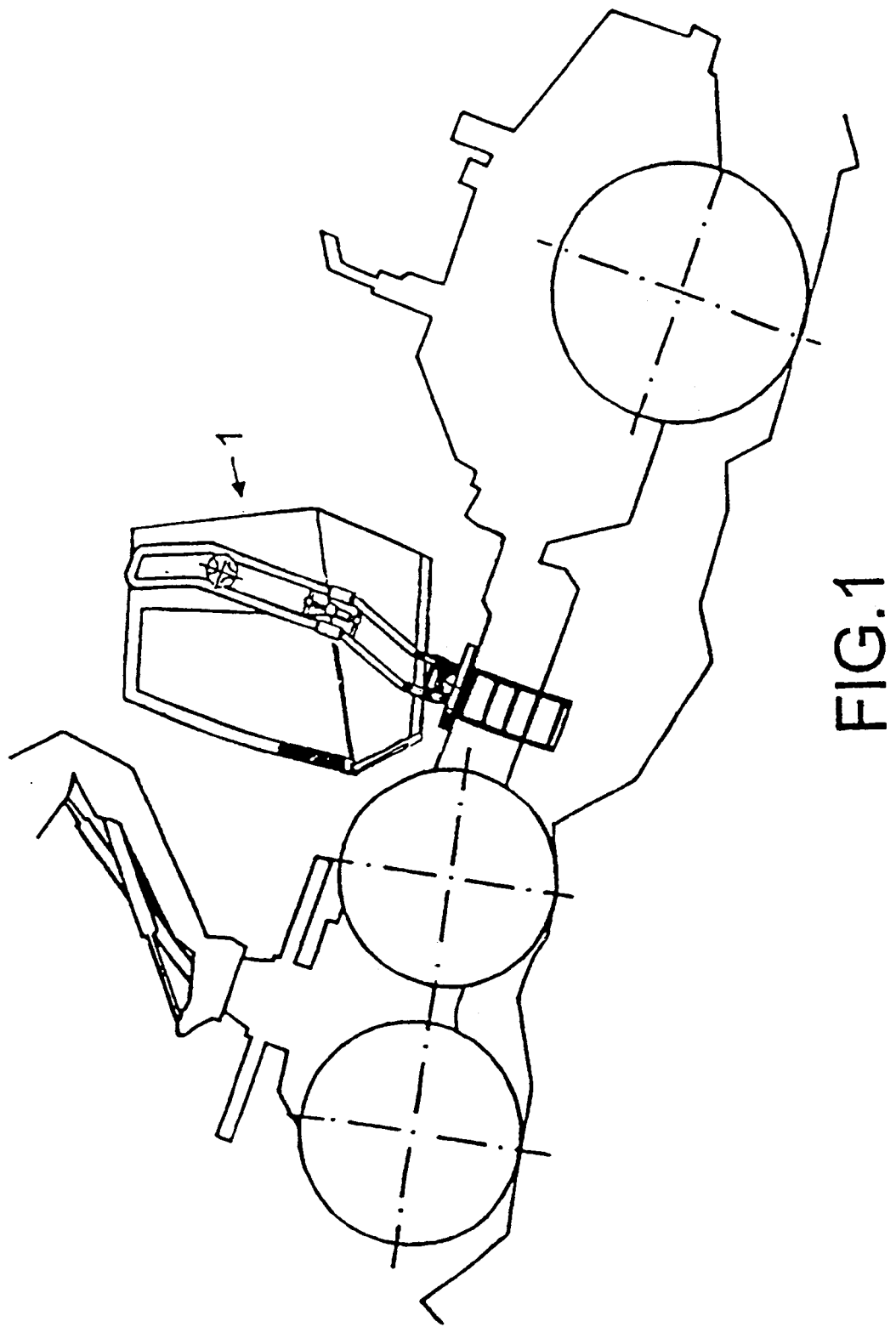
FIG. 1 shows schematically a cabin, for example, a driver's cabin and control cabin of a tree-cutting vehicle.
Figure 3:
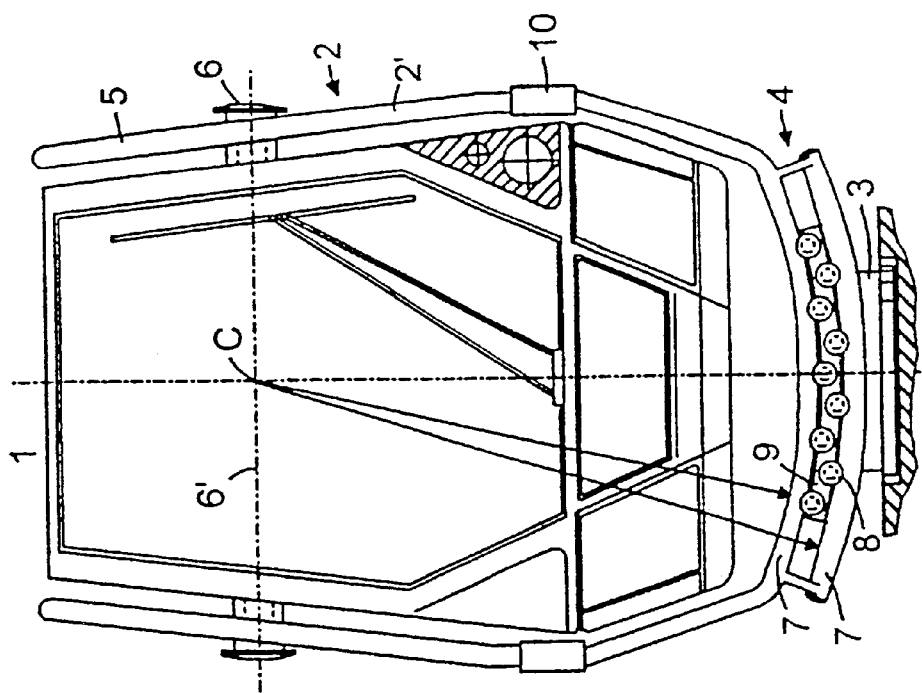
FIG. 3 shows the cabin seen from the front.
Figure 2:
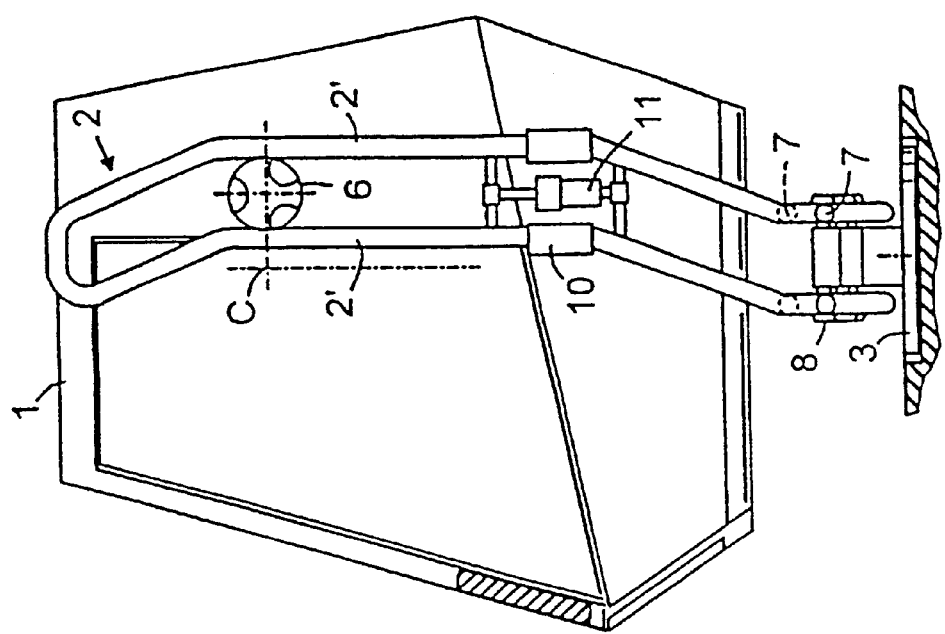
FIG. 2 shows the cabin seen from the side.
Figure 4:
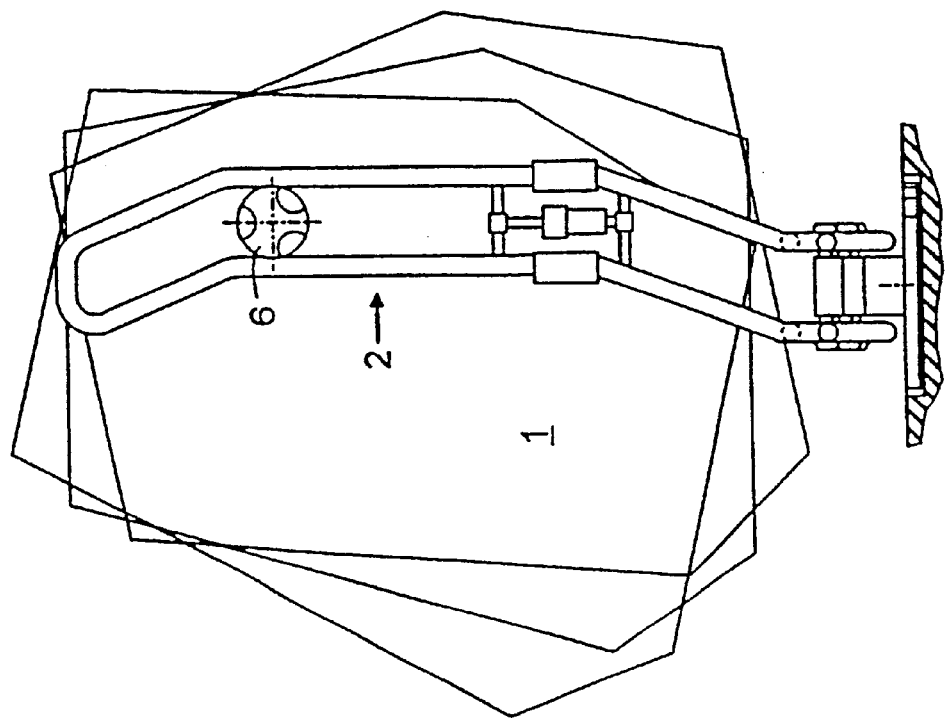
FIG. 4 shows schematically the cabin seen from the side in three pivoting positions.

In the figures, 1 designates a cabin, for example, a driver's cabin and control cabin of a tree-cutting vehicle, and 2 designates a supporting device for the cabin. 3 designates a base mounting plate that is attached to the vehicle's chassis around a vertical rotating axis. As is evident from FIG. 2 and 3, the supporting device 2 forms a lower, essentially horizontal part to form a first bearing device 4, as well as a shank 5 that extends upwards on either side of the cabin 1. As shown in the figures, the supporting device 2 comprises two parallel side projections 2' that support a bearing 6 in their upper section. This bearing supports, for example, rigidly attached, horizontal axle bar pivot arms (not shown) by means of which the cabin 1 will hang so that it can oscillate in a forwards and backwards direction around axis 6', see FIG. 4, which shows the cabin in three different oscillating positions.

For each projection 2', the horizontal part of the supporting device 2 that forms the first bearing device 4 has two partly circular curved projections 7 separated from each other and formed with radii that have a common centre C. The sides of the projections 7 that face each other are formed as running surfaces for rollers 8, also herein referred to as roller bearings. These running surfaces can be formed from the casing surface of the curved projections 7 (see FIG. 2), whereby the roller bearings 8 have an equivalent "hour glass" shape. The base mounting plate 3 supports the second bearing device 9 in the form of a partly circular sliding carriage whose radius of curvature also has its centre at C and that holds the roller bearings 8 that extend out from carriage (see FIG. 3) and engage between the projections 7 of the first bearing device 4. Every second roller bearing 8 runs against the underside of the upper projection 7 while the other roller bearings run against the top of the lower projection 7. Since the projections 7 are guided by the roller bearings 8 via the said interaction, the supporting device 2 is guided in a secure way on base mounting plate 3.

Figure 5:
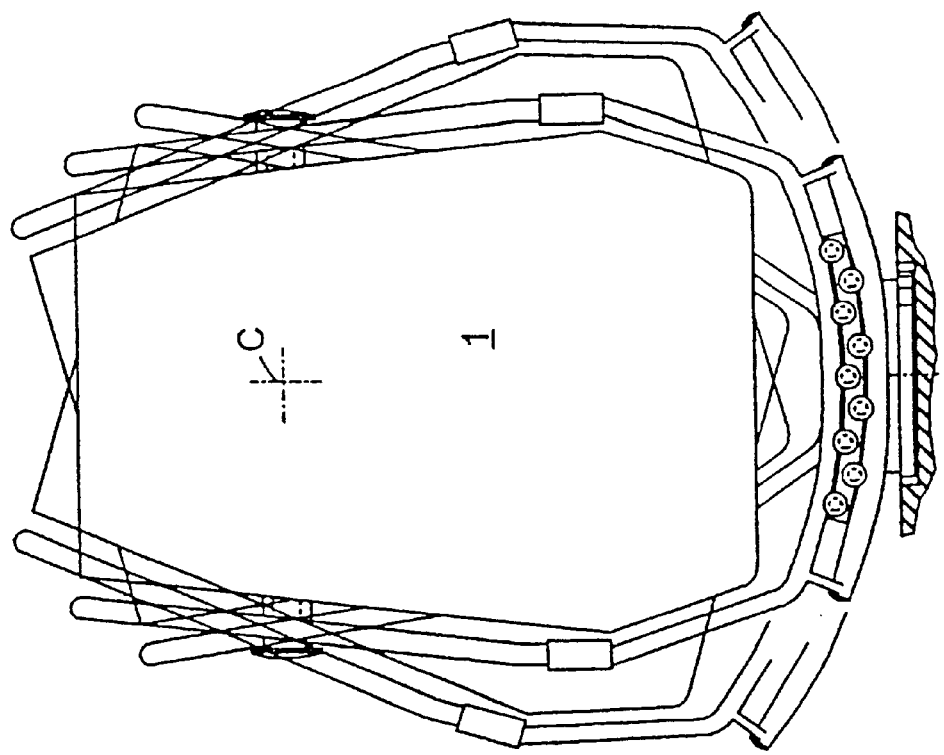
FIG. 5 shows schematically the cabin seen from the front in three pivoting positions.

The partially circular-shaped projection's 7 and the carriage's common centre C thus forms the cabin's 1 centre of oscillation in a sideways direction, as shown schematically in FIG. 5 where the cabin is depicted to be pivoted in three different positions.

By locating the cabin's centre of gravity, including the driver, at a suitable height, the force of gravity will cause the cabin to automatically pivot back and forth around axis 6' and, as shown in FIG. 5, also pivot sideways due to the supporting device's 2 projections 7 running along the carriage 9. For the sake of comfort, axis 6' and centre of oscillation C are set at the same height but somewhat displaced in the longitudinal direction forwards-backwards. It should be emphasized that this positioning of axis 6' and centre C is not absolutely essential, but that they can coincide or be displaced vertically.

To provide additional comfort, the bearing 6 held in supporting device 2 can be suitably sprung in a vertical direction. This suspension is indicated with the designation 10, whereby it should be clear that the upper part of the supporting device 2 is telescopically suspended with the lower parts. 11 indicates shock absorbers and it should also be clear that suitable dampening devices are also arranged to deaden the pivoting of the cabin forwards and backwards as well as sideways. These dampers are not described further here as they are outside of the scope of the invention and are obvious aspects for a person skilled in the area. It should also be understood that the first and second bearing devices can be formed in ways other than those shown and described here. For example, the first bearing device can be furnished with rollers while the carriage comprises a smooth partially circular-shaped body with rolling surfaces on each side. In this case, for example, the carriage has a T-shaped projection to achieve the lower rolling surfaces.

Figure 7:
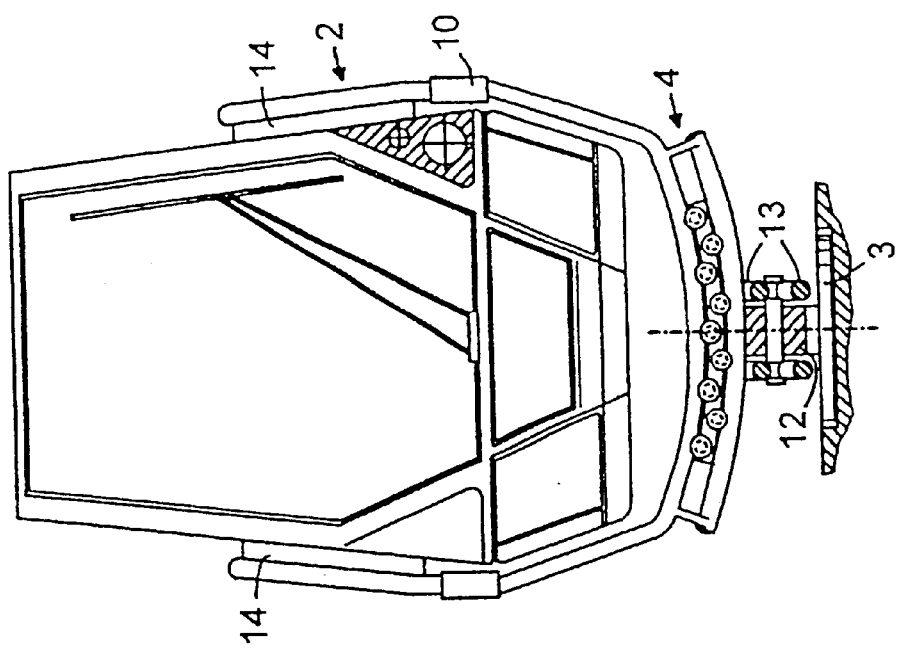
FIGS. 6 and 7 show schematically another embodiment of the invention.
Figure 6:
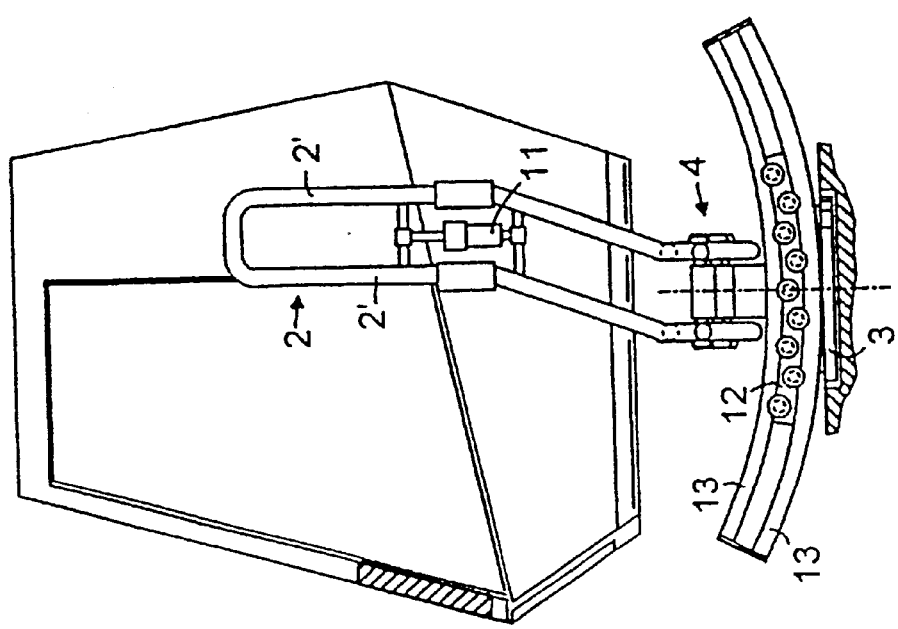

Instead of allowing the cabin to pivot in bearing 6, the equivalent pivoting around axis 6' can be achieved by means of a bearing device shaped in principle in agreement with bearing devices 4 and 9 but rotated 90° around the vertical axis in relation to bearing devices 4 and 9. Such an arrangement is shown schematically in FIGS. 6 and 7, whereby carriage 12 in this example is firmly attached to the carriage 9, while the partially circular-shaped curved projections 13 are now firmly attached to the base mounting plate 3.

In this embodiment, the cabin 1 is fixed by, for example structure 14, to the supporting device 2 upper projections permitting the suspension 10 to work as described previously.

The person skilled in the area should easily see that the bearing devices 4 and 9 and the bearing devices 12 and 13 can, instead of that shown, exchange positions with each other and still retain the intended function. Supporting device 2 would then naturally have a different form.

The rotating base mounting plate 3 allows the cabin 1 to be turned to different working positions in relation to the chassis, whereby it should be understood that the expressions "forwards" and "backwards" apply in relation to the cabin and not to the vehicle.

What is claimed is:

1. A cabin for a cross-country vehicle where the cabin is held up by a supporting device, characterized in that the supporting device includes a partially circular-shaped first bearing device lying in a vertical plane with the convex side facing downwards when the vehicle is standing horizontally, that a base mounting plate attached to a chassis of the vehicle carries a partially circular-shaped second bearing device that corresponds to and interacts with the first bearing device, whereby a common centre of the first and second bearing devices forms a first axis of oscillation for the cabin in a first plane, and that the cabin is arranged to pivot about a second axis of oscillation wherein is perpendicular to the first axis of oscillation.

2. A cabin for a cross-country vehicle where the cabin is held up by a supporting device, characterized in that the supporting device includes a partially circular-shaped first bearing device lying in a vertical plane with the convex side facing downwards when the vehicle is standing horizontally, that a base mounting plate attached to a chassis of the vehicle carries a partially circular-shaped second bearing device that corresponds to and interacts with the first bearing device, whereby a common centre of the first and second bearing devices forms a first axis of oscillation for the cabin in a first plane, and wherein the cabin is arranged to pivot about a second axis of oscillation that is perpendicular to the first axis of oscillation, and wherein the first bearing device consists of a guide track and the second bearing device of a carriage.

3. A cabin according to claim 2 characterised in that the carriage is furnished with rollers on sides thereof that interact with the guide track.

4. A cabin according to claim 3 characterised in that the rollers comprise roller bearings.

5. A cabin for a cross-country vehicle where the cabin is held up by a supporting device, characterized in that the supporting device includes a partially circular-shaped first bearing device lying in a vertical plane with the convex side facing downwards when the vehicle is standing horizontally, that a base mounting plate attached to a chassis of the vehicle carries a partially circular-shaped second bearing device that corresponds to and interacts with the first bearing device, whereby a common centre of the first and second bearing devices forms a first axis of oscillation for the cabin in a first plane, and wherein the cabin is arranged to pivot about a second axis of oscillation wherein is perpendicular to the first axis of oscillation, and that the base mounting plate is arranged to rotate about a vertical axis in relation to the chassis.

6. A cabin according to any one of the previous claims characterised in that the second axis of oscillation is formed by means of supporting bearings on the supporting device arranged on either side of the cabin.

7. A cabin according to claim 6 characterised in that the bearings supporting the cabin are arranged to be sprung in a vertical direction.

8. A cabin according to claim 1 characterised in that the common centre and the second axis of oscillation are located in a common horizontal plane.

9. A cabin according to claim 1 characterised in that the second axis of oscillation is formed from a partially circular third bearing device lying in a vertical plane with the convex side facing downwards when the vehicle is standing horizontally and firmly attached to the first or second bearing device, wherein the base mounting plate attached to the vehicle's chassis carries a partially circular-shaped fourth bearing device that is equivalent to and interacting with the third bearing device.

* * * * *